March 9, 1937.  C. E. KNAPP  2,073,407
LOG SAWING RIG
Filed April 19, 1935  6 Sheets-Sheet 5
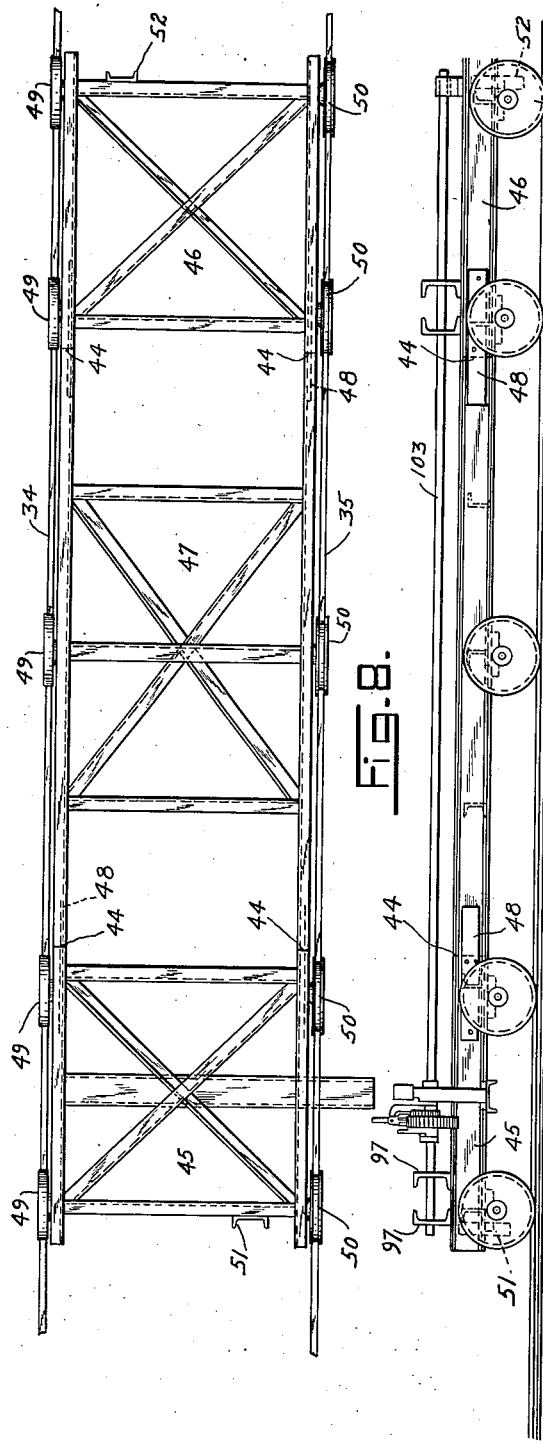
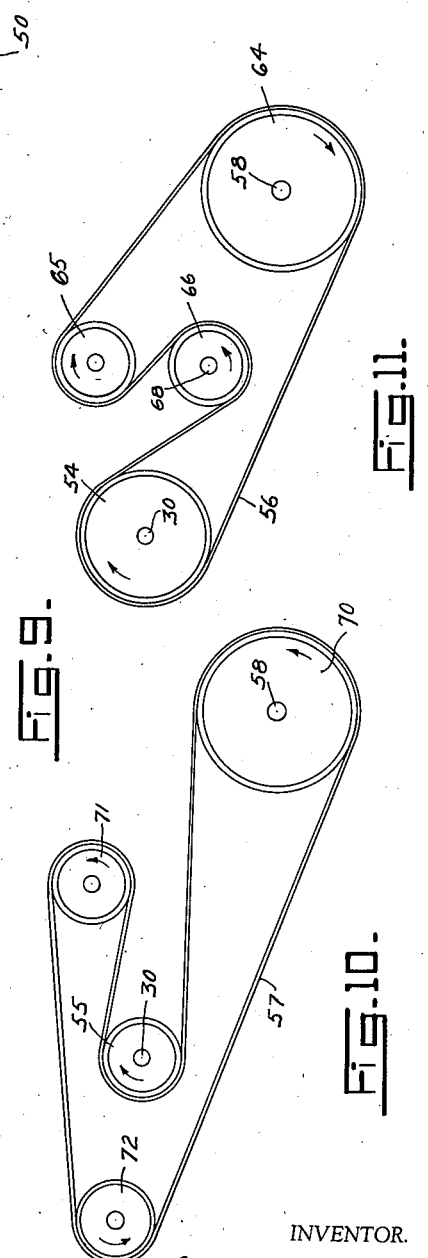
INVENTOR.
CHARLES E. KNAPP
BY
Kwis. Hudson & Kent
ATTORNEYS

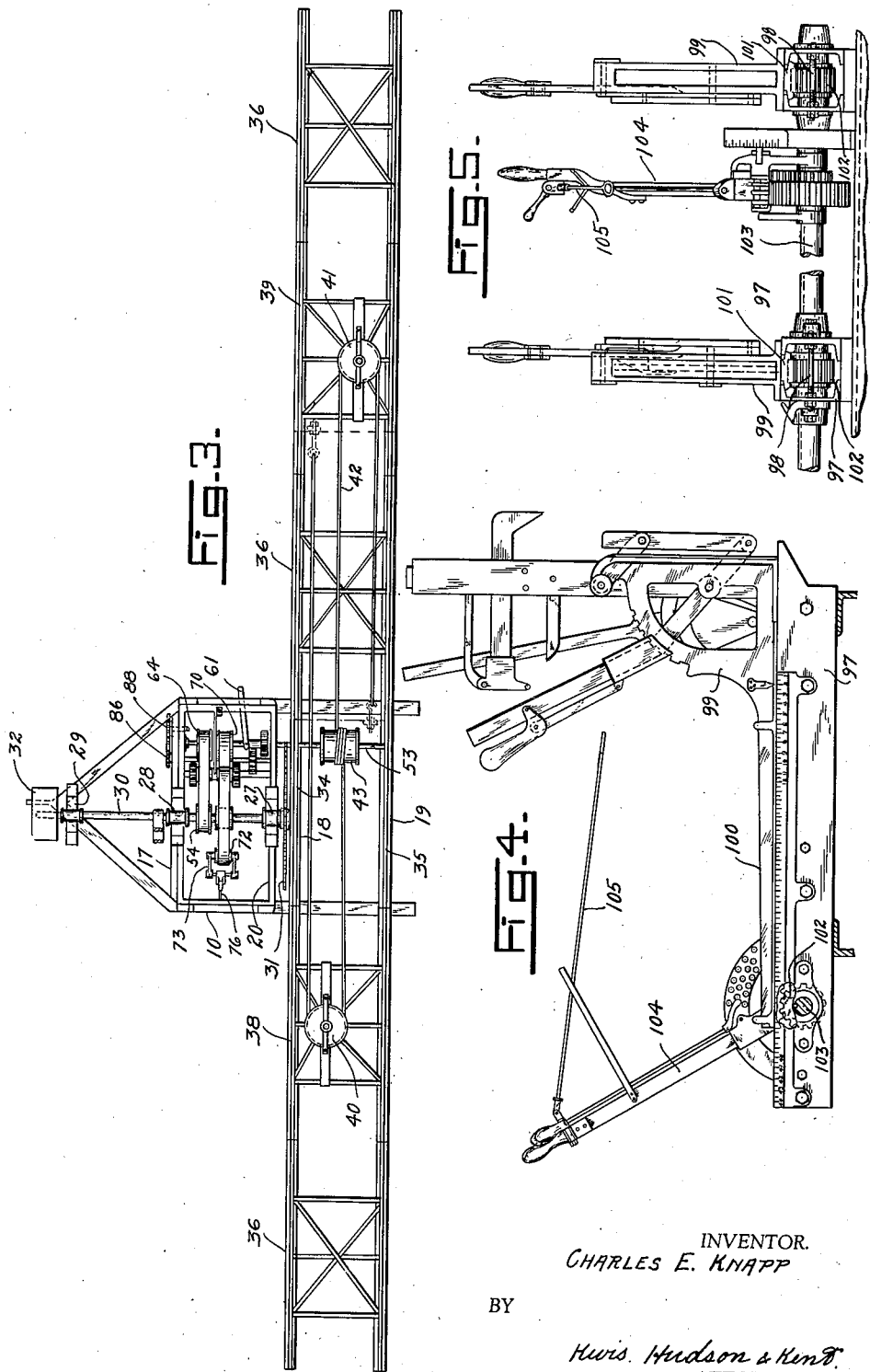

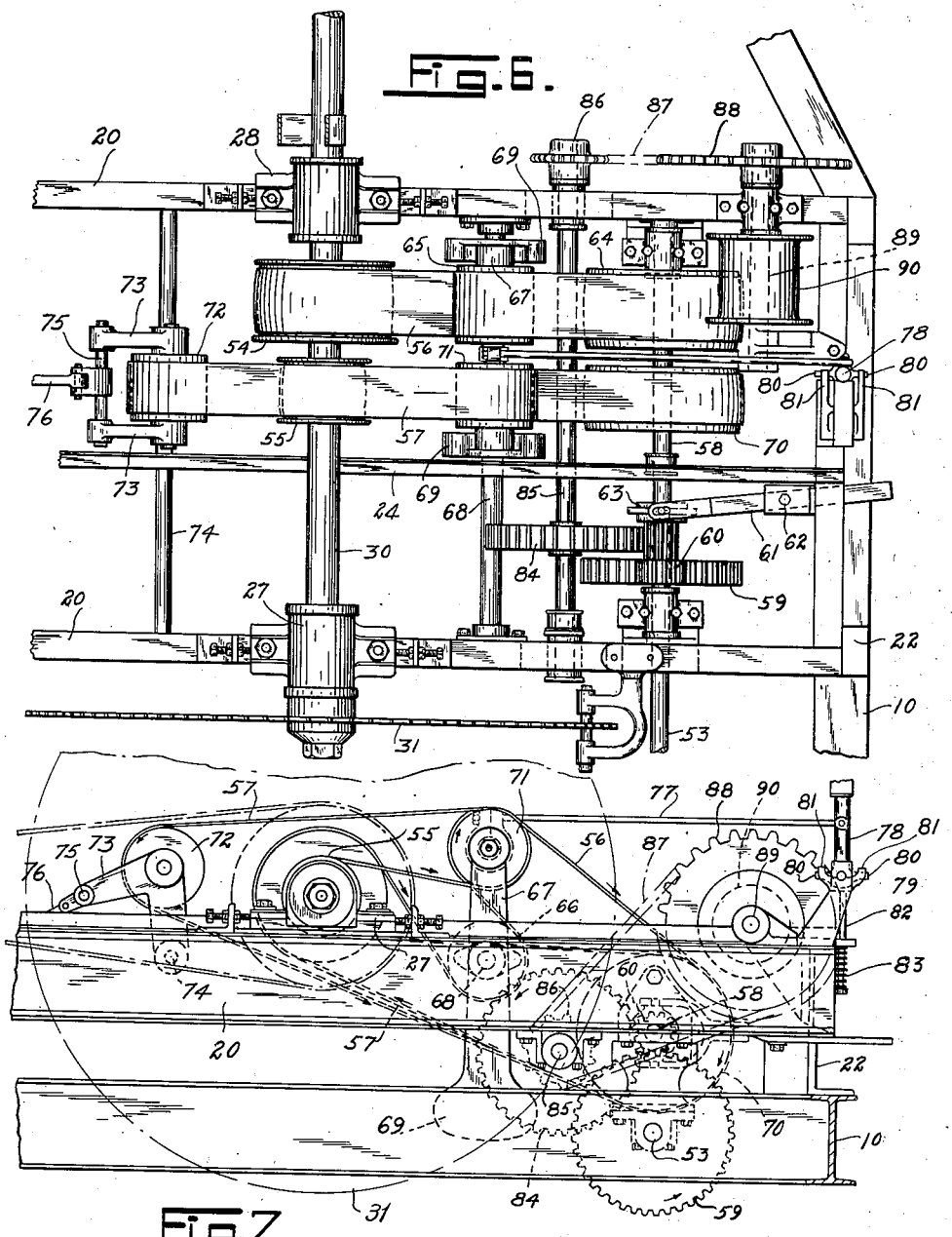

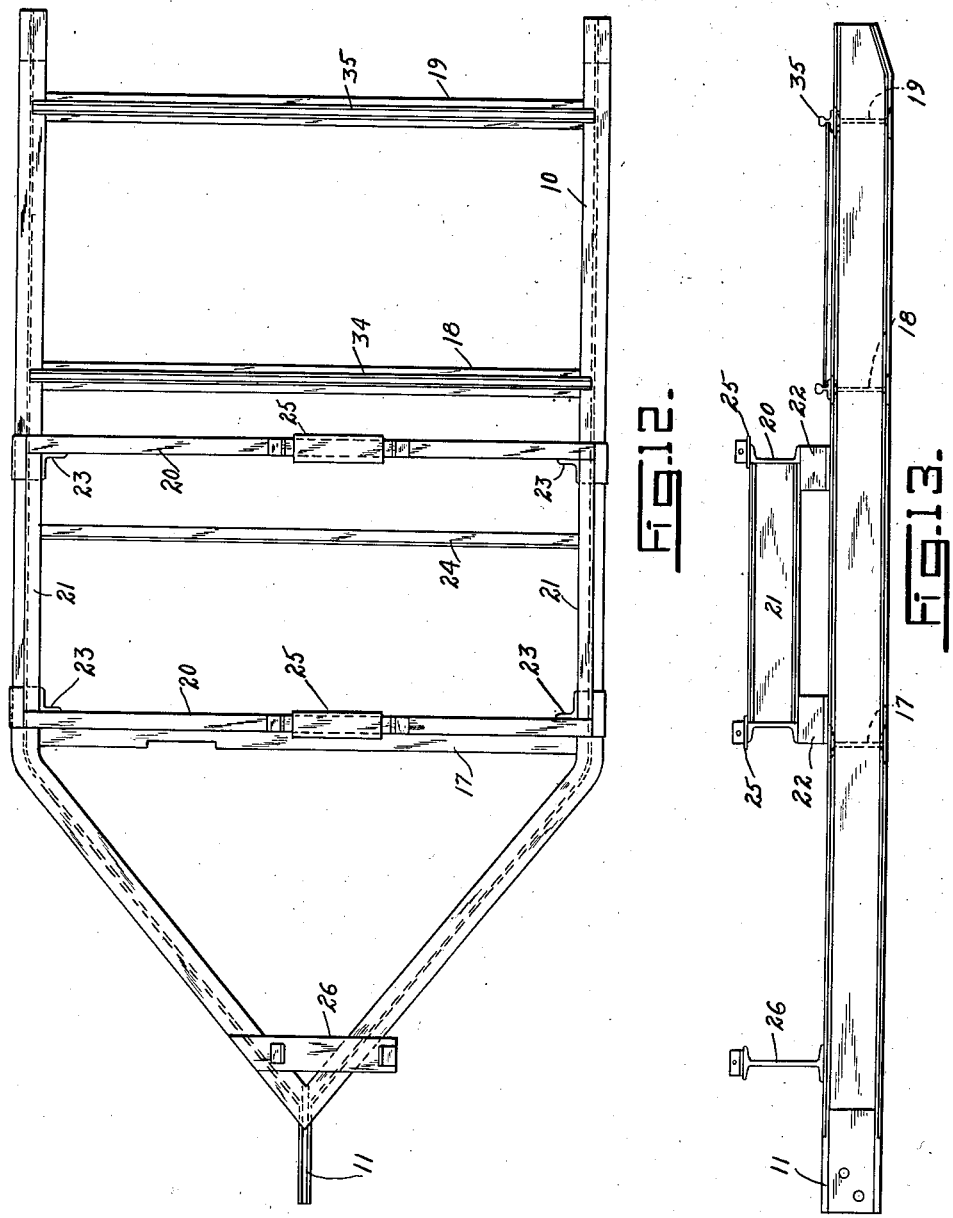

Patented Mar. 9, 1937

2,073,407

UNITED STATES PATENT OFFICE 2,073,407

LOG SAWING RIG

Charles E. Knapp, Chardon, Ohio, assignor to The Kent Machine Company, Cuyahoga Falls, Ohio, a corporation of Ohio Application April 19, 1935, Serial No. 17,309

4 Claims. (Cl. 143—43)

This invention relates to improvements in log sawing rigs, and has to do principally with a sawmill so constructed as to be truly portable while at the same time possessing that degree of rigidity which is essential to insure efficient and accurate operation.

The principal object of the invention is the provision of a sawmill answering to the above description.

Another object is the provision of a sawmill having a sub-frame of rigid construction so designed as to be employed as a trailer which may be transported anywhere that a truck or tractor can go, and upon which those parts of the mill which are not permanently connected to the sub-frame may be supported and hauled.

Another object is the provision of a permanent mounting for one section of a track for the log carriage, this section as well as the husk being welded or otherwise permanently attached to the sub-frame whereby accuracy in the alignment of the track and consequent accuracy in the sawing operation are assured.

A further object of the invention is the provision of a log carriage built in sections with the intermediate section removable and replaceable with one of different length in order that carriages of different lengths may be available.

Other objects and features of novelty will appear as I proceed with the description of that embodiment of the invention which, for the purposes of the present application, I have illustrated in the accompanying drawings, in which:

Fig. 3 is a plan view of the assembled mill, the log carriage and the setworks being omitted in order to more clearly illustrate the track construction.

Fig. 4 is an end view of the knees and setworks.

Fig. 5 is a view taken at right angles to Fig. 4.

Fig. 6 is a plan view of the husk, showing in detail the transmission means employed for driving the log carriage in either direction, and also for operating the log draw-up and turn-over mechanism, which can be operated in either direction, but only when the carriage is not moving.

Fig. 7 is an elevational view of the construction shown in Fig. 6.

Fig. 8 is a plan view of the log carriage.

Fig. 9 is a side elevation of the same with a portion of the log support and setworks added.

Figs. 10 and 11 are diagrammatic views illustrating the two transmission belts and their pulleys, by means of which driving force is transmitted in either direction.

Figs. 12 and 13 are plan and elevational views respectively of the sub-frame with the husk and the central track section all welded or otherwise permanently attached thereto, and Fig. 14 is a detail view of a sheave over which the sawdust conveyor runs.

Figure 1:
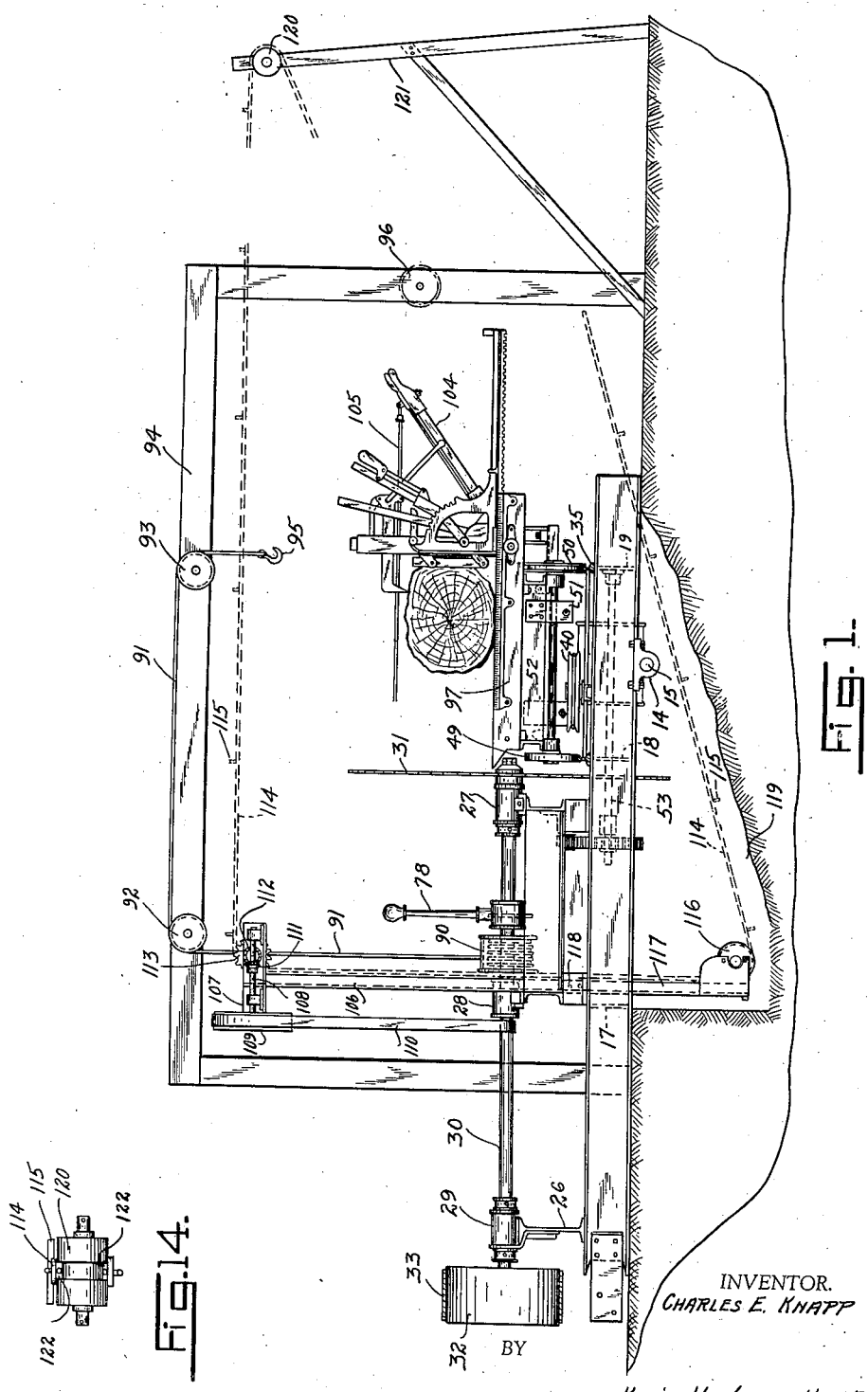
Fig. 1 is an elevational end view of the mill set up in condition for operation.

In the drawings I have shown a sub-frame 10 constructed primarily of a pair of I-beams which are parallel throughout the greater portion of their extent, but which are directed inwardly toward each other at one end of the frame, meeting to form a horizontal V. At the V there are attached to the beams a pair of plates 11 in which may be mounted a clevis 12 for connection with a chain 13 by means of which tractive force is applied to the portable mill. When the mill is being transported the sub-frame 10 in effect becomes a trailer, and the latter is drawn by a truck or tractor which is caused to support the front end of the trailer, whereby sufficient weight is applied to the rear end of the truck or tractor to give the latter good traction on the road. The V form at the forward end of the sub-frame avoids any interference between the pulling vehicle and the trailer in negotiating curves and turns. Toward the rear end of the sub-frame I attach bolsters 14 to the side members, and in these bolsters I mount an axle 15 upon which are journaled traction wheels 16. The sub-frame 10 is braced by three transverse I-beams 17, 18, and 19.

The frame or husk for the saw is mounted upon and permanently attached to the sub-frame 10 across the parallel portion of the same. The details of construction of the husk are of no particular importance in this case, except that the husk is to be constructed in as rigid a manner as possible and is to be attached to the sub-frame in as rigid and permanent a manner as possible. In the present instance I have shown the husk as consisting of channel shaped side members 20, running transversely of the sub-frame, and channel shaped end members 21, preferably welded to the side members. In order to raise the husk to the desired height above the sub-frame, the husk is supported at the corners upon short lengths 22 of angle iron which are welded both to the husk and to the frame 10. Angle iron braces 23 may be provided at the corners and welded in position. There may also be an intermediate brace 24 running lengthwise of the husk. On top of the side channels 20 of the husk are mounted two flat plates 25 which constitute supports for the saw arbor shaft. A short length of I-beam 26 is welded to the frame 10 just to the rear of the point of the frame, and the top of this I-beam also serves as a support for a bearing. The bearings are shown at 27, 28, and 29 in Fig. 1, and the arbor shaft at 30. The saw is shown at 31, being mounted in the conventional manner at one end of the shaft 30. On the opposite end of this shaft there is detachably mounted a pulley 32, by means of which power is transmitted to the mill through a belt 33 from any suitable prime mover.

Upon the sub-frame 10 in exact parallelism with the saw 31 I mount two rails 34 and 35, constituting the center section of a track for the log carriage. These rails are permanently attached to the cross braces 18 and 19 of the frame 10, preferably by welding. They are of such length as to terminate about half-way across the width of the two main I-beams of the frame 10, enabling the latter to serve as supports for other track sections that are not permanently connected to the frame, thereby assisting in the alignment and leveling of such removable track sections. Beyond the sub-frame 10 on either side there are two or more track units or sections which are detachable and removable, each section being made preferably of a length substantially equal to the width of the sub-frame 10 for convenience in packing the track sections on the sub-frame when it is used as a trailer.

Figure 2:
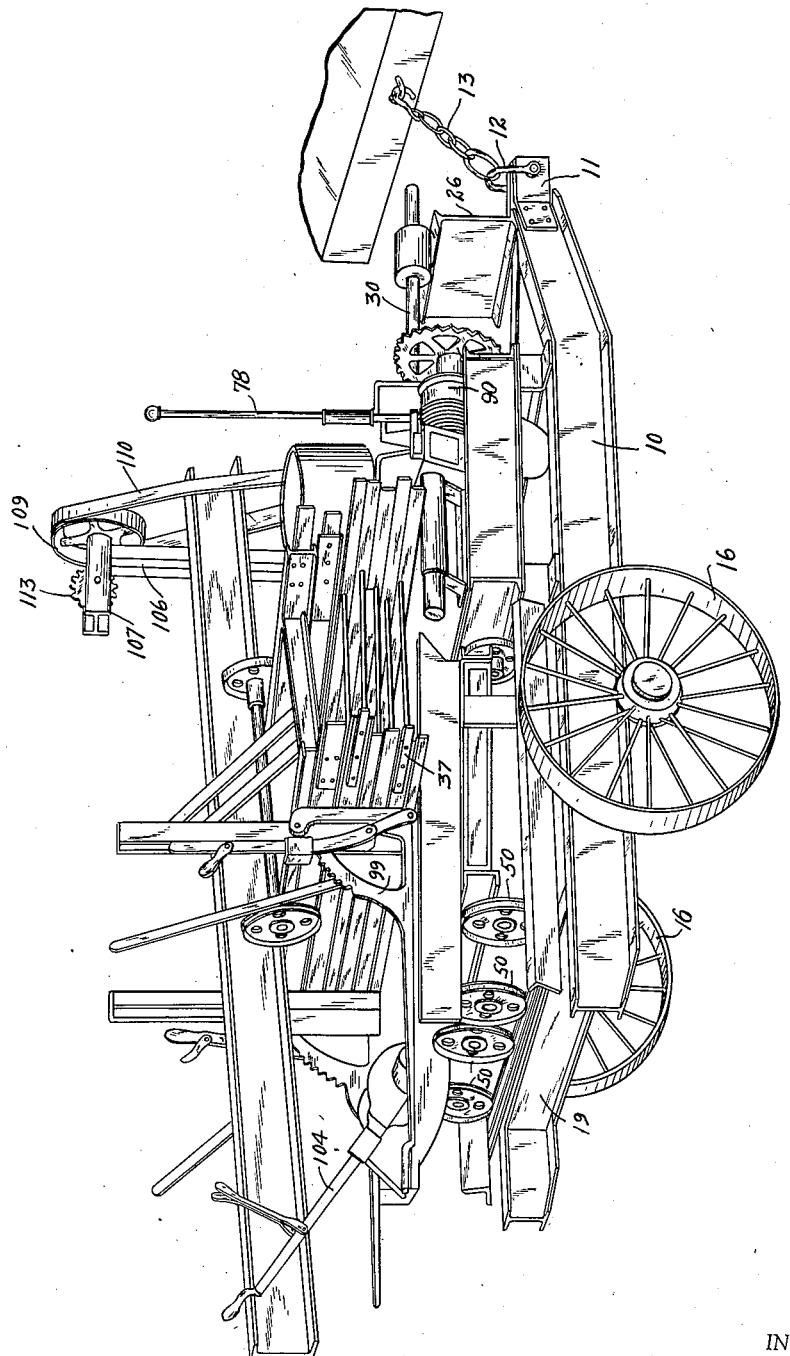
Fig. 2 is a perspective view of the mill in knockdown condition, the separable parts being mounted upon the wheeled sub-frame, by means of which all of the equipment may be transported from one place to another.

Certain of these track sections are uniform in construction and are indicated herein at 36. They are all rigidly braced, and each is provided with two track rails spaced like the rails 34 and 35 of the permanent section. The various elements of each section or unit are permanently connected together, preferably by welding. The rails of each section are attached to the rails of the adjacent section or sections by means of fish plates, and these plates are preferably permanently attached to one section by welding, as indicated in Fig. 2 at 37, and bolted to the other section.

The sections or units 38 and 39 of the track support horizontal pulley sheaves 40 and 41 respectively, over which runs a cable 42 that is employed in the reciprocation of the log carriage, this cable being attached at its ends to opposite ends of the carriage and at an intermediate point having several turns around a drum 43 by means of which it is driven.

It will be understood that when the mill is set up for operation the wheels 16 of the sub-frame 10 are removed, and the latter is supported upon firm ground which has been suitably leveled off for the purpose. The track sections 36, 38 and 39 are then put into position, connected together and supported upon railroad ties or other means by which the track is leveled. The alignment of the track rails is very easily accomplished inasmuch as the rails 34 and 35 are accurately aligned with respect to the saw when they are assembled at the factory. In the field therefore it is necessary merely to align the removable sections with the permanent section. Any number of removable sections may be employed, depending upon the length of the logs which are to be sawed.

The log carriage is made in three sections or units, the division lines in the side rails of the units being indicated at 44 in Figs. 8 and 9. The two end units 45 and 46 are approximately alike, each having two axles and two pairs of supporting wheels. The middle section 47 is however quite different, having only one axle, centrally disposed, and one pair of supporting wheels. The direct load of the log is supported principally on the end sections 45 and 46, the middle section 47 serving largely as a spacing and connecting unit between the end sections. I make a plurality of metal sections 47 of different lengths, whereby the carriage as a whole may be made in different lengths. The three sections or units are held together by fish plates shown at 48, which are preferably welded to the center section 47 and bolted to the end sections 45 and 46. On the side of the carriage nearest the saw, I use flat tread wheels 49, while on the side remote from the saw the wheels 50 have flanges on each side thereof. This is for the reason that more dust and debris collect on the rail on the saw side, so that the guiding function of the flanged wheels is better served when they run upon the remote rail. Small vertical channel brackets 51 and 52 are welded to the outer ends of the carriage, and it is to these brackets that the ends of the cable 42 are secured, the attachment preferably providing means for adjustment in order that the cable may be properly tensioned.

The drum 43, by means of which the cable 42 is driven in one direction or the other, is fixed upon a shaft 53 that is mounted in the sub-frame 10. This shaft is driven in either direction at the will of the operator, the driving force coming from the saw arbor shaft 30 through mechanism which will now be described. On the saw shaft 30 between the side members 20 of the husk there are keyed two belt pulleys 54 and 55. These pulleys drive belts 56 and 57, respectively, which transmit motion in opposite directions to a shaft 58, the latter shaft being mounted in the husk directly above the shaft 53. These two shafts are normally geared together by means of a gear 59 on shaft 53 and a pinion 60 which is keyed to slide on shaft 58, being adapted to be moved on the shaft by means of a yoke and lever 61 pivoted at 62 on the husk and connected with a collar 63 on the hub of the pinion. The extremity of the lever extends slightly beyond the end of the husk in order that it may be conveniently reached by the operator.

The belt 56 runs over a pulley 64 on shaft 58, and also in reverse directions over two idler pulleys 65 and 66 which are mounted upon an oscillatable frame 67 fixed to a shaft 68 that is pivotally mounted in the husk side members. The frame 67 is provided with counterweights 69 which tend to hold it in the vertical position. It will be apparent that when the upper end of frame 67 is swung toward the left, as viewed in Fig. 7, belt 56 will be put under tension and become operative to drive pulley 64 in the same direction as pulley 54 which, as shown in Fig. 11, is clockwise. Belt 57 runs over a pulley 70 on shaft 58, an idler 71 on frame 67 and an idler 72. The latter idler is independently adjustable, being mounted upon and between a pair of bell cranks 73 which are pivotally supported upon a rod 74 fixed in the husk. The free arms of the two bell cranks are joined by a rod 75 to which is attached a tensioning connection 76 that may be shortened or lengthened for adjustment purposes by any suitable means. It will be apparent that the movement of the upper end of frame 67 to the right, as viewed in Fig. 7, will tension belt 57, whereupon pulley 70 will be driven in the anti-clockwise direction.

The frame 67, when in the vertical or neutral position illustrated in Fig. 7, leaves both belts 56 and 57 slack, so that no motion is transmitted to shaft 58. The upper end of frame 67 may be connected, by means of a rod 77, with a hand lever 78 which is pivotally mounted at 79 on the husk. The lever 78 carries a pair of laterally extending arms 80. Overhanging these arms there are two fingers 81 which are connected to a rod 82 that is held under downward tension by a coil spring 83. Hence, when the lever 78 is moved in either direction away from neutral position, illustrated in Fig. 7, the spring 83 is contracted, and when the operator releases the handle of lever 78, relieving the pressure thereupon, the lever is returned to neutral position by the spring.

The movement of lever 78 to the right, as viewed in Fig. 7, puts belt 57 under tension and shaft 58 is driven in an anticlockwise direction, by means of which shaft 53 is turned in the clockwise direction, and the cable 42 to the right of drum 43 is wound upon that drum moving the log carriage to the right, as viewed in Fig. 3. This is the forward or sawing direction. When the lever 78 is moved toward the left, the tension on belt 57 is relieved and belt 56 is put under tension, driving pulley 64 in the clockwise direction, which results in imparting travel to the carriage in the reverse direction, termed the gig-back.

When the transmission mechanism is set up, the effective length of rod 77 is adjusted so as to obtain the correct tension for belt 56 in order that it may be slack when the lever 70 is in neutral position and tensioned by a slight movement of the lever toward the left. Next, the belt 57 is placed under the correct tension by the adjustment of idler 72. Both belts are then under the proper tension and the control of the belts by lever 78 becomes very sensitive.

The transmission mechanism just described is also used to control the operation of a log haul-up and turn-over mechanism. In that case the drive from the transmission to shaft 53 is interrupted by the movement of pinion 60 away from the position illustrated in Fig. 6 to a position where it is in mesh with a gear 84 fixed upon a shaft 85 journaled in the husk. At one extremity of the shaft 85 there is a sprocket wheel 86 over which runs a chain 87 that drives a sprocket 88 fixed upon a shaft 89 that is journaled in the husk and carries a drum 90. This drum is adapted to receive and wind a cable 91 which may extend over sheaves 92 and 93 supported upon any suitable, and preferably temporary, beam 94. A hook 95, secured to the free end of the cable, is adapted to be engaged in the log on either side to turn it over on the log supports. The same cable may be used to haul up logs onto the log carriage, but in such case the cable would be caused to extend over a further sheave 96 and thence back to the log to be moved in a manner that will be understood by those skilled in the art. When the lever 61 has been shifted to disconnect the carriage drive and connect the drive for drum 90, the operation of the cable 91 in either direction may be effected by the manipulation of lever 78. These two mechanisms, that is the carriage drive and the haul-up or turn-over drive, may be operated alternately, but neither one may be operated until the other is disconnected from the transmission.

The log supports each consist of a pair of structural steel channels 97 that are supported upon the side rails of the log carriage. They are held in properly spaced relation, partially at least, by rods 98 threaded at their ends and held in place by nuts, as illustrated. Knees, which may be of more or less conventional design, are shown at 99. Each of them has a rearward extension 100 sliding on the upper surface of channels 97. Against the lower surface of each of these extensions there is secured a depending guide element 101, which is beveled off on either side to slidably fit the lower or inner inclined surfaces of the flanges on the channels. When wear occurs between the relatively sliding surfaces of the knees and channels 97, it may be taken up by reducing the effective length of rods 98, the inclined or beveled surfaces of the channels and of the guide 101 coming closer together and thereby compensating for wear when the effective lengths of rods 98 are reduced.

Rack teeth are cut into the lower side of the guide element 101, and pinions 102 mesh with the teeth on each of these racks. These pinions are slidably keyed upon a long shaft 103 which is provided with a keyway extending throughout its length. This shaft is adapted to be turned by any suitable setworks, operated by hand lever 104 with an auxiliary operating rod 105 for the convenience of the sawyer. The setworks which I prefer to employ, and which is illustrated herein, is that covered by U. S. Patent 1,561,649, issued to C. H. Knight on November 17, 1925, to which reference may be had for a more detailed description.

On the husk I mount, preferably in a permanent manner, an upwardly extending post 106 provided at its upper end with a cross head 107 in which is journaled a shaft 108 carrying a pulley 109 that is driven by a belt 110 running over the shaft 30, from which it takes its drive directly. On the shaft 108 there is a bevel gear 111 which meshes with a second bevel gear 112 on a cross shaft which also carries a sprocket wheel 113. This sprocket wheel is the means for driving an endless sawdust conveyor, which consists of a chain 114 running over the sprocket and a series of transverse blades 115. The conveyor runs vertically downward from the sprocket 113 and around a sheave 116 which is mounted upon an extension 117 of the post 106, being preferably hinged to the lower end of the post at 118 so that it may be swung up out of the way when the mill is to be moved. A hole 119 is dug in the ground to receive the lower end of the sawdust conveyor and the lower part of the saw 31. The outer end of the conveyor runs over a sheave 120 which may be supported upon a temporary frame 121. The sheaves 116 and 120 are shown in detail in Fig. 14. It will be noted that these sheaves are cylindrical and that each one is provided with a central groove 122 for the reception of the chain 114, the cylindrical surface of the sheave serving to guide the blades 115, thereby assisting materially in preventing the lower length of conveyor from twisting, as that would interfere with its function of dragging sawdust out of the hole and up onto a pile to one side of the mill.

The operation of the mill, it is believed, will be understood from the foregoing description. Its principal departure from the prior art consists in the portability of the mill when considered in connection with its construction affording rigidity and accurate alignment equivalent to that of mills designed for permanent installation in one place. When the equipment is to be moved from one location to another, the removable sections of track are disassembled, the log carriage is separated into its three units, the sub-frame 10 is raised from the ground and mounted upon its wheels 16, the carriage and track sections and other odd removable parts are piled onto the sub-frame 10, which then becomes a trailer, and the whole mill is ready to be transported. It is thus possible to move an efficient, accurate mill to the logs, rather than hauling the logs to the mill, with a highly important saving in hauling costs.

In the foregoing description I have necessarily gone somewhat into detail in order to explain fully the particular embodiments of the invention herein illustrated, but I desire it to be understood that such detailed disclosures are not to be construed as amounting to limitations, except as they may be included in the appended claims.

Having thus described my invention, I claim:

1. In a portable sawmill, a rigid sub-frame of structural steel elements, a husk mounted upon and permanently connected to said sub-frame, an intermediate track section also supported upon and permanently connected to the sub-frame, further track sections adapted to be detachably connected with said intermediate track section, said sub-frame having side members which approach each other and are joined together at one end of the frame, and traction wheels removably connected with the sub-frame near the opposite end thereof.

2. In a portable sawmill, a rigid sub-frame of structural steel elements having side members parallel throughout the greater portion of their length, said side members being inwardly directed at one end of the frame and meeting in a V, a husk mounted upon and permanently connected to the parallel portions of the frame side members, a track partially supported upon the parallel portions of the frame side members, a carriage movable upon said track, a saw arbor shaft mounted in the husk at right angles to said track, said shaft extending out to the V end of the frame, and a power pulley on the outer end of said shaft.

3. In a sawmill, a power shaft, a driven shaft, transmission means manually controlled for imparting motion to said driven shaft in either direction, and log haul-up and turn-over means comprising a drum and a cable windable upon said drum, and manually controlled means for imparting turning motion to said drum from said driven shaft during the rotation of the latter in either direction.

4. In a sawmill, a power shaft, a driven shaft, transmission means manually controlled for imparting motion to said driven shaft in either direction, a traveling carriage, means for imparting motion to said carriage from said driven shaft, a log haul-up and turn-over means comprising a drum and a cable windable thereupon, and manually controlled means for connecting either said carriage drive or said drum one at a time to said driven shaft.

CHARLES E. KNAPP.